(12) United States Patent
Pearce et al.

(10) Patent No.: US 7,116,335 B2
(45) Date of Patent: Oct. 3, 2006

(54) TEXTURING SYSTEMS FOR USE IN THREE-DIMENSIONAL IMAGING SYSTEMS

(75) Inventors: Simon Pearce, Hertfordshire (GB); Simon Fenney, Hertfordshire (GB)

(73) Assignee: Imagination Technologies Limited, Hertfordshire (GB)

( * ) Notice: Subject to any disclaimer, the term of this patent is extended or adjusted under 35 U.S.C. 154(b) by 0 days.

(21) Appl. No.: 10/931,625

(22) Filed: Sep. 1, 2004

(65) Prior Publication Data

US 2005/0024378 A1 Feb. 3, 2005

Related U.S. Application Data

(63) Continuation of application No. 09/831,241, filed as application No. PCT/GB99/03711 on Nov. 8, 1999, now abandoned.

(30) Foreign Application Priority Data

Nov. 6, 1998 (GB) ................................ 9824407.2

(51) Int. Cl.
  *G09G 5/00* (2006.01)
(52) U.S. Cl. ...................... 345/587; 345/555; 345/606; 345/608
(58) Field of Classification Search ................ 345/587, 345/606, 608
   See application file for complete search history.

(56) References Cited

U.S. PATENT DOCUMENTS

| 5,548,709 A |   | 8/1996 | Hannah et al. |
| 5,651,104 A |   | 7/1997 | Cosman |
| 5,822,452 A |   | 10/1998 | Tarolli et al. |
| 5,831,625 A |   | 11/1998 | Rich et al. |
| 5,892,517 A | * | 4/1999 | Rich ........................ 345/582 |
| 5,945,997 A |   | 8/1999 | Zhao et al. |
| 6,236,405 B1 |   | 5/2001 | Schilling et al. |
| 6,295,070 B1 |   | 9/2001 | Wood |
| 6,304,268 B1 |   | 10/2001 | Iourcha et al. |
| 6,339,428 B1 |   | 1/2002 | Fowler et al. |
| 6,452,603 B1 | * | 9/2002 | Dignam ...................... 345/582 |
| 6,469,700 B1 |   | 10/2002 | Munshi et al. |

FOREIGN PATENT DOCUMENTS

| EP | 0718797 | 6/1996 |
| EP | 0810553 | 12/1997 |
| GB | 2240016 A | 7/1991 |

(Continued)

OTHER PUBLICATIONS

Nintendo 64 CPU Specs http://earthlink.net/~aquavideo/n64spects.html, Oct. 1999.
Nintendo 64 product review http://www.winternet.com/~mr_64.sys.html, Jan. 1998.

(Continued)

*Primary Examiner*—Kee M. Tung
*Assistant Examiner*—Antonio Caschera
(74) *Attorney, Agent, or Firm*—Flynn, Thiel, Boutell & Tanis, P.C.

(57) ABSTRACT

A texturing system for use in a three-dimensional imaging system comprises a memory (22) for storing mip-map data for use in texturing an image. A controller (24) retrieves from the memory the mip-map data required and this data is stored in a cache (30). A lower-level mip-map generator (36) generates portions of the mip-map which is next below, in the hierarchical series, the mip-map of which portions are held in the cache. A trilinear interpolator (34) interpolates one output texel from input texels from the two mip-map levels. The texture data is represented by compressed codes. The lower-level mip-map generator (36) interpolates on the compressed code values.

20 Claims, 9 Drawing Sheets

FOREIGN PATENT DOCUMENTS

| | | |
|---|---|---|
| GB | 2245460 | 1/1992 |
| GB | 2284526 | 6/1995 |
| GB | 2288304 | 10/1995 |
| GB | 2171579 | 8/1996 |
| WO | WO 97/41534 | 11/1997 |
| WO | WO 00/10126 | 2/2000 |

OTHER PUBLICATIONS

Hin Jang, Tri Linear MIP Mapping http://www.scs.ryweson.ca/~h2jang/gfx.html, Apr. 1996.

Intel, Texture Maps 3D Primer http://www.intel.ie/technology/3d/docs/texture.html, 1999.

* cited by examiner

TEXTURING SYSTEMS FOR USE IN THREE-DIMENSIONAL IMAGING SYSTEMS

This is a continuation of Ser. No. 09/831,241, filed May 3, 2001 now abandoned, which was the national stage of International Application No. PCT/GB99/03711, filed Nov. 8, 1999, which International Application was published in English.

FIELD OF THE INVENTION

This invention relates to texturing systems for use in three-dimensional imaging systems, such as are used in computer displays. Such texturing systems are for example employed in the display of computer games.

PRIOR ART

The following prior documents and materials should be referred to for further information on the background to this technology. Certain of them are referred to where convenient by number in the subsequent description:
[1] Catmull, E., "A Subdivision Algorithm for Computer Display of Curved Surfaces", Ph.D. Thesis, report UTEC-Csc-74-133, Computer Sciences Department, University of Utah, Salt Lake City, Utah, December 1974.
[2] Blinn, J. F. and M. E. Newell, "Texture and Reflection in Computer Generated Images", CACM, 19(10), October 1976, 542–547.
[3] Wolberg, G., "Digital Image Warping", IEEE Computer Society Press, Los Alamitos, Calif., 1990.
[4] Williams, L., "Pyramidal Parametrics", SiGGRAPH 83, pages 1–11.
[5] VideoLogic, "Apocalypse 3Dx data", available from VideoLogic Limited, Kings Langley, England.
[6] Microsoft Corporation, "Texture and Rendering Engine Compression (TREC)", Microsoft Technical Brief, internet address: www.microsoft.com/hwdev/devdes/whntrec.htm
[7] Beers, A. C. Agrawala, M. and Chaddha, N., "Rendering from Compressed Textures", 1996 Computer Graphics Annual Conference, page 373.
[8] Hakura, Z. S. and Gupta, A. "The design and analysis of a cache architecture for texture mapping", Computer Architecture News, Vol. 25, no. 2, pp. 108–20, May 1997.
[9] United States Patent U.S. Pat. No. 5,612,747 "Method and apparatus for vector quantization caching in a real time video coder".
[10] United Kingdom Patent Application GB-A-2,297,886 "Texturing and shading of 3-D Images", Applicants: VideoLogic Limited.
[11] Gray, R. M., "Vector Quantization", IEEE Transactions on Communications, January 1980, pp. 4–20.
[12] Koegel Buford, J., "Multimedia Systems", Addison-Wesley publishing company, 1994.
[13] Foley, F. and van Dam, A., "Computer Graphics Principles and Practice", Addison-Wesley publishing company, 1990.
[14] Microsoft, "DirectX 6.0 SDK Documentation", Microsoft Corporation, 1 Microsoft Way, Redmond, USA. Internet address: www.microsoft.com/directx.

BACKGROUND OF THE INVENTION

Computer based images are commonly formed of an array of picture elements or pixels. Each surface to be displayed may be represented by the pixels within a polygon, commonly a triangle. The surface is given color, texture and/or shading by an operation known as "texture mapping". Textures are stored as arrays of pixels, conveniently termed texels (texture pixels). Thus "texture mapping" involves the mapping of a 2D (two-dimensional) array of texels onto another 2D array of pixels representing a surface in a 3D (three-dimensional) scene. This technique was developed by Catmull [ref. 1] and refined by Blinn and Newell [ref. 2]. Perspective texture mapping involves rotating and translating the texture map so that its perspective appears correct on the final image. Texture mapping improves the realism of the scene by giving the surface of an object a realistic finish. An example of this is mapping a marble texture to the surface of a statue, giving the statue the appearance that it is made of marble. For a large scene many different texture bitmaps are required to represent all the different textures which might be present in the scene.

Figure 1:
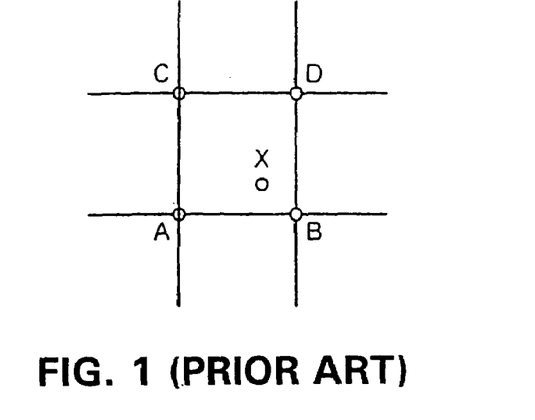
FIG. 1 is a diagram illustrating bilinear filtering of the texture map in an imaging system.

As just noted, a 3D scene is usually represented by a number of polygons or triangles. In order to fill a polygon with a texture, each pixel on its surface is used to calculate the co-ordinate of a texel in the texture map. The nearest texel to the one calculated in the texture map may be used to shade the finally displayed pixel. This is called point sampling. Alternatively, bilinear filtering or bilinear interpolation may be used to improve the quality of the textured image. In bilinear filtering the point in the texture map from which the 2D pixel is to be mapped onto the 3D surface is calculated to sub-pixel accuracy. Bilinear filtering or interpolation is then used to blend the four closest pixels to this calculated position in the texture map in order to attain a more accurate representation of the pixel color. This is illustrated in the accompanying FIG. 1, where the texels A, B, C, and D are blended to provide a texel value for a pixel at point X on the two-dimensional image plane. This operation of bilinear, i.e. two-axis, filtering (or interpolation) is further described in ref. 3.

Figure 2:
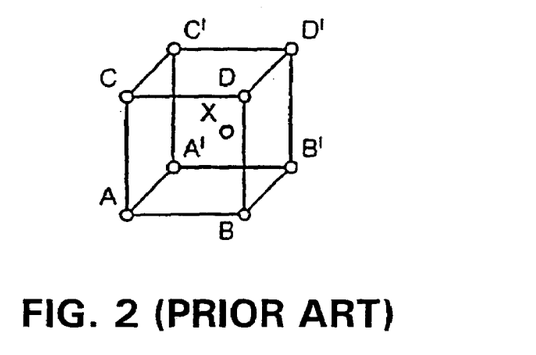
FIG. 2 is a similar diagram illustrating trilinear filtering of the texture map in an imaging system.
Figure 3:
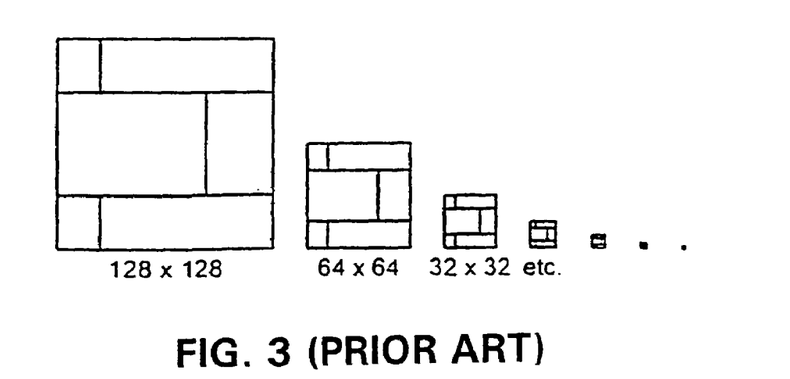
FIG. 3 illustrates a series of mip-maps.

Trilinear (three-axis) filtering is the same process over the four closest pixels on two different mip-map levels [ref. 4]. This is illustrated in FIG. 2 of the present application. Mip-maps are copies of the original texture map which have been pre-processed by being filtered so as to be successively reduced to half the resolution. MIP here stands for MULTUM IN PARVO (much in a small place). This is repeated until the resulting image is 1 pixel in size (this assumes that the texture is square and of a size which is a power of 2), so that there are a hierarchical series of the mip-maps. FIG. 3 shows an example of a brick texture at 128×128 resolution with the associated lower mip-map levels. A mip-map can be thought of as a pyramid.

Texture filtering has the effect of reducing the occurrence of aliasing when sampling textures. For more information on aliasing see ref. 3.

Three-dimensional image generation is computationally intensive. Animated 3D images for games and Computer Aided Design (CAD) applications are becoming increasingly expensive in terms of processing power, as scenes become more photo-real and images are required to respond in real-time. A large number of floating point calculations are required to determine the geometry of the polygon structure in the scene and a large number of arithmetic operations are required to fill and shade the polygons. Dedicated hardware is available [ref. 5] that can perform these operations many times more efficiently than software. Accesses to stored databases are also a limiting factor to performance. Local memory in dedicated hardware can reduce the effect of any memory access bottlenecks. Texture mapping is particularly memory intensive especially when performing a filtering (that is, interpolation) operation where many texture pixels are read for every pixel that is mapped onto the display.

The size of a 2D texture map data is therefore reduced by texture compression so that it can be located into a smaller memory space. A small memory requirement leads to lower system costs. The original texture map can then be retrieved from the compressed data by decompression. As 3D scenes become more realistic, texture maps become larger and more numerous, making the use of texture compression more important. Several schemes have already been developed including Texture and Rendering Engine Compression (TREC) from Microsoft [ref. 6]. Beers [ref. 7] first discussed the technique of rendering images from compressed textures.

It is convenient at this point to consider, and define, the various types of memory that are available to the system designer. The term "local memory" refers to solid state semiconductor memory located close to the memory control semiconductor device or circuit. The term "internal memory" refers to memory located within the particular semiconductor device being referred to. "External memory" is any memory outside the semiconductor device. Local memory can be DRAM based. DRAM is an acronym for Dynamic Random Access Memory, which is a solid-state semiconductor. Synchronous DRAM (SDRAM) enables data accesses to be co-ordinated by a clock signal. SDRAM has a higher access bandwidth capability than DRAM due to its pipelined architecture but is more expensive. Local memory and internal memory can be DRAM or SDRAM based. External memory can be sold-state or a mass storage array such as a hard disk. Semiconductor memory is very expensive and makes up a large percentage of the overall cost of a computer system.

DRAM is addressed over a multiplexed address bus, that is, the address needed to access an individual data item is transmitted to the memory device in two parts. The core memory array in the DRAM device is a rectangular matrix where a single data item is addressed when a row control line and a column control line are activated at the same time. This requires a separate row and column address. If the row address does not change between sequential accesses, then only the column address needs to be transmitted. A row of data in the DRAM array is known as a page. When the row address remains unchanged between accesses, the accesses are said to be "in page". "In page" accesses are much quicker than those that span two or more pages, and memory system designers endeavour to keep bursts of accesses in page. Some memory devices, such as SDRAM, make use of multiple memory banks to improve performance. Each memory bank can have its own page open, permitting data accesses to separate areas of memory without breaking page.

One technique used to improve memory performance is "Memory Caching" in which the result of all external memory accesses is stored in a separate internal memory. This internal memory can be accessed much faster than external memory. If the result of a particular memory access already resides in the cache, then the cache is read instead of the external memory. This has the effect of reducing traffic to the external memory, and therefore reducing the "bandwidth" requirements of that memory. The bandwidth requirement of a memory system is often directly related to the cost of that system. In a fixed bandwidth system an increased bandwidth requirement can lead to a reduction of overall system performance.

Texturing is the most performance-intensive process of 3D imaging as it requires all textures to be retrieved from memory. Techniques such as trilinear and bilinear filtering (interpolation) require up to eight texture pixels or texels to be retrieved from memory for every pixel projected onto the display, as described above and illustrated in FIGS. 1 and 2. Texturing therefore requires a very high bandwidth path into memory. Texture caching can be employed to reduce the texturing bandwidth requirement and increase system performance. The optimum performance objective is to be able to read all necessary texels in one processing pipeline clock cycle. Some work has already been done on studying the effects of using a cache to improve the performance of texture accesses [ref. 8]. Hakura demonstrates how caches can be highly effective for texture mapping graphics, and concludes that the effective memory to bandwidth ratio can be reduced by a factor of three to fifteen using certain caching strategies.

As previously indicated, texture mapping is used to improve 3D image quality by mapping high detail onto a surface of a 3D object. This should be done without complicating the object's geometry. However, texture mapping produces a wide variety of visual artefacts, including aliasing [ref. 13]. Bilinear filtering [ref. 3] is used to improve the quality of the resulting image but there remain many artefacts that bilinear filtering cannot solve, including depth aliasing. Depth aliasing is the result of the texture getting more compressed as an object moves further from the viewpoint. This form of aliasing can be resolved by use of mip-maps [ref. 4], but there is still a problem called mip-banding. Mip-banding occurs during the transition period between mip-maps when the texture changes from one level of detail to another. This may appear for example on a road, seen in the foreground, which disappears into the distance. Successive mip-maps are used along the road and the transition from one mip-map to the next can be visible. This problem can be solved with the application of trilinear filtering [ref. 4], which interpolates the level of detail between mip-maps, as described above.

The best form of trilinear filtering is that which is performed on a per-pixel basis. This requires eight texture pixels (texels) to produce the final on-screen pixel. As these texels can be located anywhere in memory, eight separate memory reads are often required. Trilinear filtering is performed between two mip-levels, and so four memory reads occur from one mip-map location and four from another. Textures are usually stored in local memory, although system memory texturing is becoming more popular. These memories have a finite bandwidth and are very often required to serve as a resource to memory for many different applications. Set-up parameters, depth information, and display information are usually stored in local memory, and system applications are usually run from system memory. Eight individual memory reads per pixel is usually beyond the capabilities of many memory systems. Added to page change between mip-maps, this often achieves less than adequate 3D performance.

The memory bandwidths required for a trilinear texture access system is dependent on the number of memory accesses needed for each texture filtering operation and the pixel throughput performance demanded by the application. Equation 1 shows how the texture bandwidth can be determined. The equation also shows how the bandwidth of page breaks must also be taken into account.

$$\text{Bandwidth}_{texture} = ((\text{Accesses}_{pixel} \times \text{Width}_{memory}) + (\text{Accesses}_{page\_break} \times \text{Width}_{memory})) \times \text{Throughput}_{pixel} \quad \text{Equation (1)}$$

Where:

Bandwidth$_{texture}$ is the texture bandwidth demanded from the memory measured in bytes/s. This is not the memory bandwidth that can be supplied by the memory.

Accesses$_{pixel}$ is the average number of memory accesses per pixel. Not all the required texels can be read in one access, even with the right data width.

Accesses$_{page\_break}$ is the average number of memory access slots lost to page breaks per pixel. A single page break using SDRAM requires at least 8 accesses slots.

Width$_{memory}$ is the width of the memory data bus, measured in bytes. This has to be at least 8 bytes (64 bits) to ensure that four texels can be read in one clock cycle.

Throughput$_{pixel}$ is the pixel throughput demanded by the application, measured in pixels/s. For most modern applications this is around 100 Mpixels/s.

The average accesses per pixel is the number of separate memory accesses required to retrieve all data necessary for the filtering operation. Using a 64-bit memory bus, maximum throughput is achieved if four 16-bit texels are required and they reside in the same data word. Unfortunately this is not always the case and very often the texture data resides in two or four separate words. Equation 2 shows how Accesses$_{pixel}$ can be found, taking into account the varying number of accesses for a single texture operation.

$$Accesses_{texture} = \frac{((Percentage_{single} \times 1) + (Percentage_{double} \times 2) + (Percentage_{quadruple} \times 4) \times Mipmaps)}{Factor_{compression}}$$

Equation (2)

Where:

Percentage$_{single}$ is the percentage of single mip-map accesses that can be retrieved in one memory access.

Percentage$_{double}$ is the percentage of single mip-map accesses that can be retrieved in two memory accesses.

Percentage$_{quadruple}$ is the percentage of single mip-map accesses that can be retrieved in four memory accesses.

Mipmaps is the number of mip-maps involved in the filter operation.

Factor$_{compression}$ is the compression factor if the texture is compressed.

The average number of accesses is calculated by taking into account the likelihood that all data will be retrieved in single, double or quadruple accesses. The equation also takes account of the number of mip-maps required in the filtering operation, trilinear filtering uses two but bilinear requires only one. The equation also shows how the average number of accesses is reduced linearly with compression. Obviously the less data there is to fetch the less memory accesses that are required and the more likely all the data will reside in the same data word.

Equation 1 thus shows that, even with the use of texture caches, the physical memory bandwidth requirement still remains beyond the scope of any viable memory system. For this reason texture compression is employed, not only to reduce the physical size of the stored texture, with its associated reduction in memory cost, but also to reduce the volume of texture data that is transferred from that memory.

Equation 2 shows how the compression factor affects the number of memory accesses. High performance, dedicated hardware can be used to decompress the textures in real-time after they have been read from memory. Many texture compression techniques have been tried, including: Vector Quantisation (VQ) [ref. 11]; Color lookup tables (CLUT) or Palletisation [ref. 12]; Discrete Cosine Transformation (DCT) [ref. 12]; and several proprietary techniques [refs. 6 and 14]. But each has its associated problems: VQ and Palletised require two memory reads or large internal data caches and quality can be limited; DCT requires a large amount of decompression logic, and with a limited silicon budget this can be unfeasible; and many proprietary techniques provide limited compression ratios and quality. As Equation 1 demonstrates, these techniques only go part way towards resolving the bandwidth requirements of trilinear filtering.

Memory access streams that continuously swap between different memory banks can have a large effect on performance. Equation 1 shows how dominant page breaks are to the performance of texture filtering as a whole. For trilinear filtering, page breaks can be particularly problematic, where a number of mip-maps can often span more than one memory page.

3D imaging techniques often demand such a high level of performance that only dedicated hardware solutions can be used. This often requires the development of a special silicon chip. As well as performing texture mapping, the chip will often be called upon to perform all the geometry processing, polygon set up, image projection, illumination calculations, fogging calculations, hidden surface removal, and display control. Therefore it is critical that each stage in the generation of a 3D image is made as small as possible to enable all processes to fit on the same silicon die. As well as requiring a large memory bandwidth, a trilinear filtering operation can only be implemented in a large amount of logic and therefore silicon area. It is important that an optimum solution be found that limits the required logic, and therefore cost, to a minimum.

It is seen from the foregoing that the requirements of memory, speed and ease of construction of the chip are very substantial and are taxed to the full in 3D imaging, particularly when texture mapping. Even using all available techniques for meeting the requirements, the constraints are still very difficult to meet if high quality real-time imaging is to be achieved.

SUMMARY OF THE INVENTION

The invention in its various aspects is defined in the independent claims below, to which reference should now be made. Advantageous features are set forth in the appendant claims.

Preferred embodiments of the invention are described below with reference to the drawings. In these embodiments the efficiency of trilinear texture filtering is improved by the generation of the lower-level texture mip-map on the fly from the upper-level mip-map, and with the use of texture caching and texture decompression as a means of meeting the high memory bandwidth requirements. Removing the need to read the lower-level mip-map in a separate memory access, removes page break problems and enhances performance.

More particularly, the preferred texturing systems comprise a memory for storing mip-map data for use in texturing an image, the mip-map data comprising a hierarchical series of mip-maps of different levels of decreasing resolution. Data is received at an input indicating the type of mip-map data required and the level of the mip-map or mip-maps from which the data is to be taken. A controller retrieves from the memory the mip-map data required in accordance with the input data, and this data is stored in a cache. A lower-level mip-map generator generates portions of the mip-map which is next below, in the hierarchical series, the mip-map of which portions are held in the cache. A trilinear interpolator receives from the cache mip-map data from one level of mip-map and from the lower-level mip-map generator data from the next lower level of mip-map, and interpolates one output texel from input texels from the two mip-map levels.

Some data compression schemes lend themselves well to the generation of lower mip-maps on the fly by providing the required quantity of decompressed data and by closely supporting the filtering algorithm used to generate the lower-level mip-map. These techniques may be used to enhance the performance and quality of a 3D rendered image while minimising the hardware overhead.

In one preferred embodiment, the texture data is represented by arbitrary compressed codes, in which selected compressed code values define principal colors and other compressed code values define intermediate colors which can be formed by selected weighted averages of principal colors, the corresponding code values also being weighted averages of the code values of the selected principal colors. The lower-level mip-map generator interpolates an output texel from a plurality of input texels by operating on the compressed code values.

BRIEF DESCRIPTION OF THE DRAWINGS

The invention will now be described in more detail, by way of example, with reference to the drawings, in which.

DETAILED DESCRIPTION OF THE PREFERRED EMBODIMENTS

Figure 4:
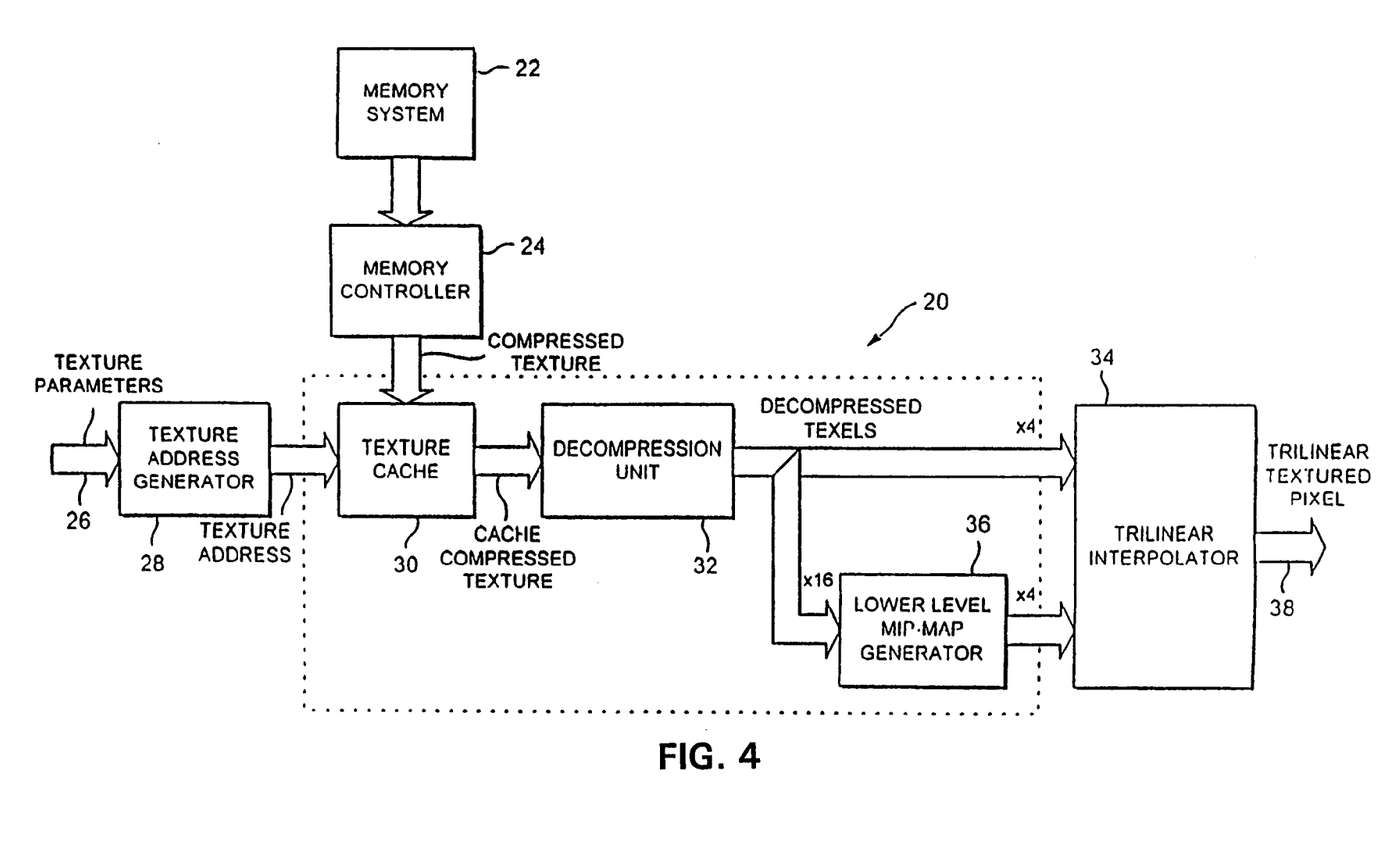
FIG. 4 is a block schematic diagram of part of an imaging system in accordance with the present invention.

FIG. 4 shows a specific embodiment of a texturing system in accordance with the invention. The texturing system 20 comprises a memory system 22 forming part of the memory used by the imaging system as a whole, and which is controlled in known manner by a memory controller 24. The memory 22 holds inter alia a compressed texture map, and the output of the memory through the memory controller 24 consists of compressed texture from the requested part of the texture map. Parameters defining the texture required for any surface are received at an input 26 and applied to a texture address generator 28 to address the part of the memory 22 where the desired texture is located. The compressed texture is retrieved from memory by the memory controller 24 and held in a texture cache 30. The retrieved texture will correspond to a particular texture type representing the type of surface to be displayed. For example this may be part of a brick wall or the surface of a road. This surface texture will be held in mip-map form, as described above, actually in compressed mip-map form, and the mip-map which is used will be the one which is the next in front of the surface, account being taken of the distance of the surface from the observer.

The output from the texture cache 30 is applied to a decompression unit 32, which decompresses or decodes the texture values to provide decompressed texels. The decompressed texels are then applied both to a trilinear interpolator 34 and to a generator 36 for generating the relevant part of the next lower mip-map to that held in the texture cache 30. The output of the generator 36 is also applied to the trilinear interpolator 34. Thus the interpolator receives the texels from the mip-map in front of and that behind the surface point under consideration, so that a trilinear interpolation, as illustrated in FIG. 2, can be executed. The trilinear interpolator provides a trilinear-textured pixel at an output 38.

In operation, therefore, the texture address generator 28 feeds the addresses of the eight trilinear texels to the texture cache 30, which then fetches the associated compressed texture data from memory 22. The decompression unit (DU) 32 then decompresses 16 upper mip-map texels from the compressed data. Four are selected as the requested upper-level texels, and all 16 are used by the lower mip-map generator 36 to generate the lower-level mip-map texture. This is because four upper-level texels will be used to generate each lower-level texel, as described below. These upper-level and lower-level mip-maps are then used by the trilinear interpolator 34 to generate the single trilinear pixel. Although as many as 16 texels are required for this technique to work, which, uncompressed, would represent a large memory bandwidth, when compressed this represents a considerable memory bandwidth improvement with minimum page breaks.

Figure 5:
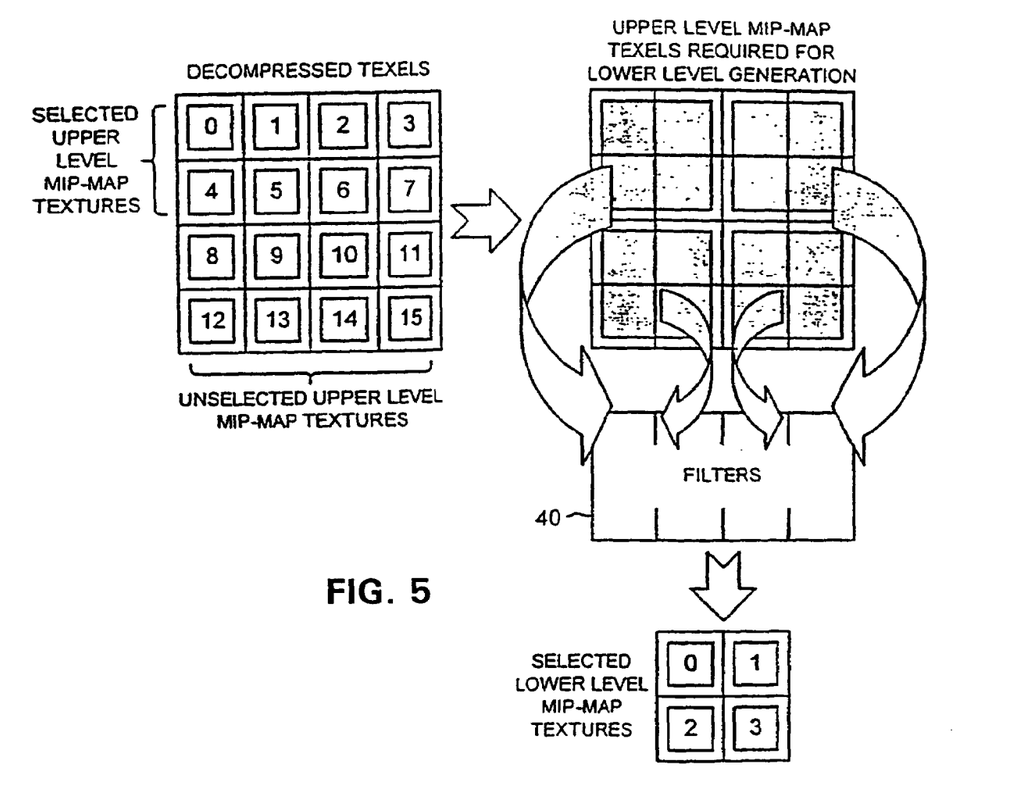
FIG. 5 is a diagram illustrating the operation of the embodiment of FIG. 4.

The lower-level mip-map is generated by four parallel filters or interpolators 40 that are able to take the 16 upper-level texels and generate the four lower level in one clock cycle. FIG. 5 illustrates this process. Out of the 16 original texels, four are decoded to produce the four upper-level texels which are directly used for trilinear filtering. These 16 are also divided into four quadrants, each containing four texels, which are then filtered by four digital low-pass filters to produce the four lower-level mip-map texels required for trilinear filtering. This filtering algorithm is shown in Equation 3:

Lower-level color value0=(upper0+upper1+upper4+upper5)/4

Lower-level color value1=(upper2+upper3+upper6+upper7)/4

Lower-level color value2=(upper8+upper9+upper12+upper13)/4

Lower-level color value3=(upper10+upper11+upper14+upper15)/4    Equation (3)

By applying actual values to Equation 1 and Equation 2, the cost of trilinear filtering can be determined. It has been determined that in a conventional system, four accesses of 64-bit data are required for each trilinear pixel when uncompressed, with an average of two page breaks per pixel. This gives a total bandwidth requirement of 16 Gbytes/second for a system that must produce 100 Mpixels per second. Such performance is unacceptable, but even when the texture data is cached and compressed the bandwidth demanded is not much better (13.2 Gbytes/s). However, when the double page break is removed by generating the lower mip-map "on the fly" in the generator 36 of FIG. 4, in accordance with this invention, the bandwidth is reduced to an acceptable level. Cached and compressed texture bandwidth requirements for this system are of the order of only 200 Mbytes/s. A 64-bit memory system running at 100 MHZ has a peak bandwidth capability of 800 Mbytes/s, so the required 200 Mbytes/s is well within its capacity. Indeed, the lower-level mip-map construction system embodying the invention can leave spare bandwidth which will be available for other uses.

In summary, therefore, it will be seen that the texturing system of FIG. 4, which is designed for use as part of a three-dimensional imaging system, includes the memory 22 for storing mip-map data for use in texturing an image, the mip-map data comprising a hierarchical series of mip-maps of different levels of decreasing resolution. The input 26 receives input data indicating the type of mip-map data required, and the level of the mip-map or mip-maps from which the data is to be taken. The controller 24 is coupled to the input and to the memory for retrieving from memory the mip-map data required in accordance with the input data. The cache 30 is coupled is to the controller for storing portions of mip-map data retrieved from memory which relate to a selected mip-map level. The trilinear interpolator 34 is coupled to the cache to receive mip-map data from one level of mip-map, namely the upper level of the two levels from which data is needed, and to interpolate an output texel from input texels from two mip-map levels. In accordance with the invention, the texturing system also includes the lower-level mip-map generator 36 which is coupled between the cache and the trilinear interpolator, and generates in real-time portions of the mip-map next below (in the hierarchical series) the mip-map of which portions are held in the cache.

Figure 6A:
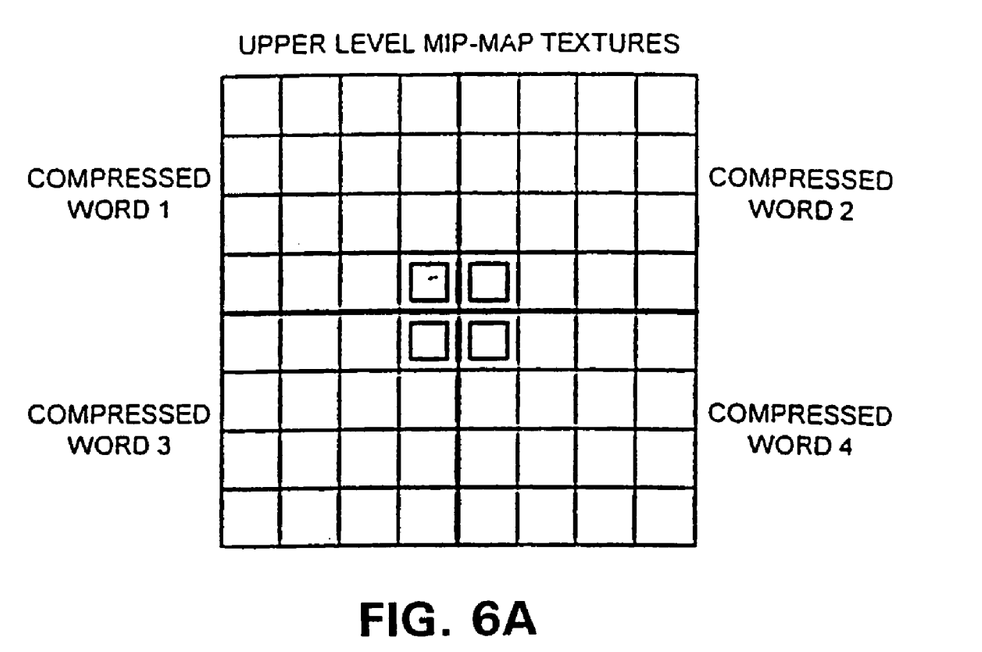
FIGS. 6A and 6B illustrate the storage of texture words in a worst-case scenario.
Figure 6B:
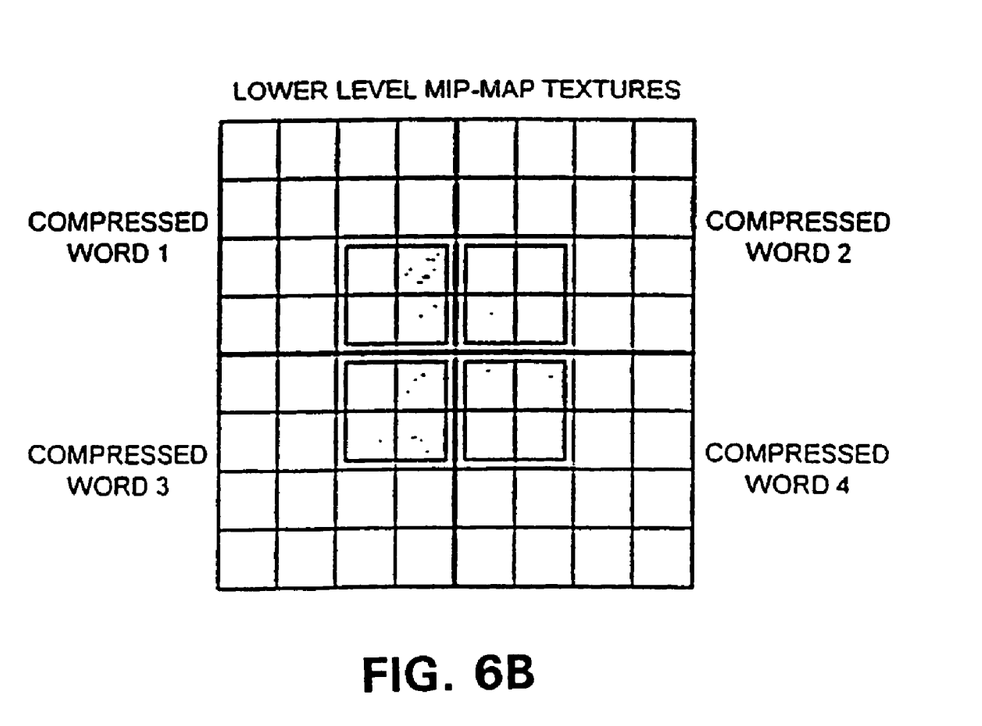

The embodiment of the invention illustrated in FIG. 4 shows how one cache 30 and one decompression unit (DU) 32 are required to return all data necessary to construct a complete trilinear interpolated pixel. A problem exists, however, when the filter algorithm needs data from two or four additional data words. FIGS. 6A and 6B show the worse case situation. Consider the texture bitmap divided into tiles, with each tile representing the texture pixels provided by one compressed data word. In this example the data word contains 16 texture pixels. The darker outlined boxes in FIGS. 6A and 6B represent the tiles. In this example, the filter algorithm requires texture pixels from four separate compressed data words. For a single cache/decompression system, this worst case situation requires four cache reads and therefore a minimum of four clock cycles. This problem also exists, to a lesser extent, when two separate data words are required.

Figure 7:
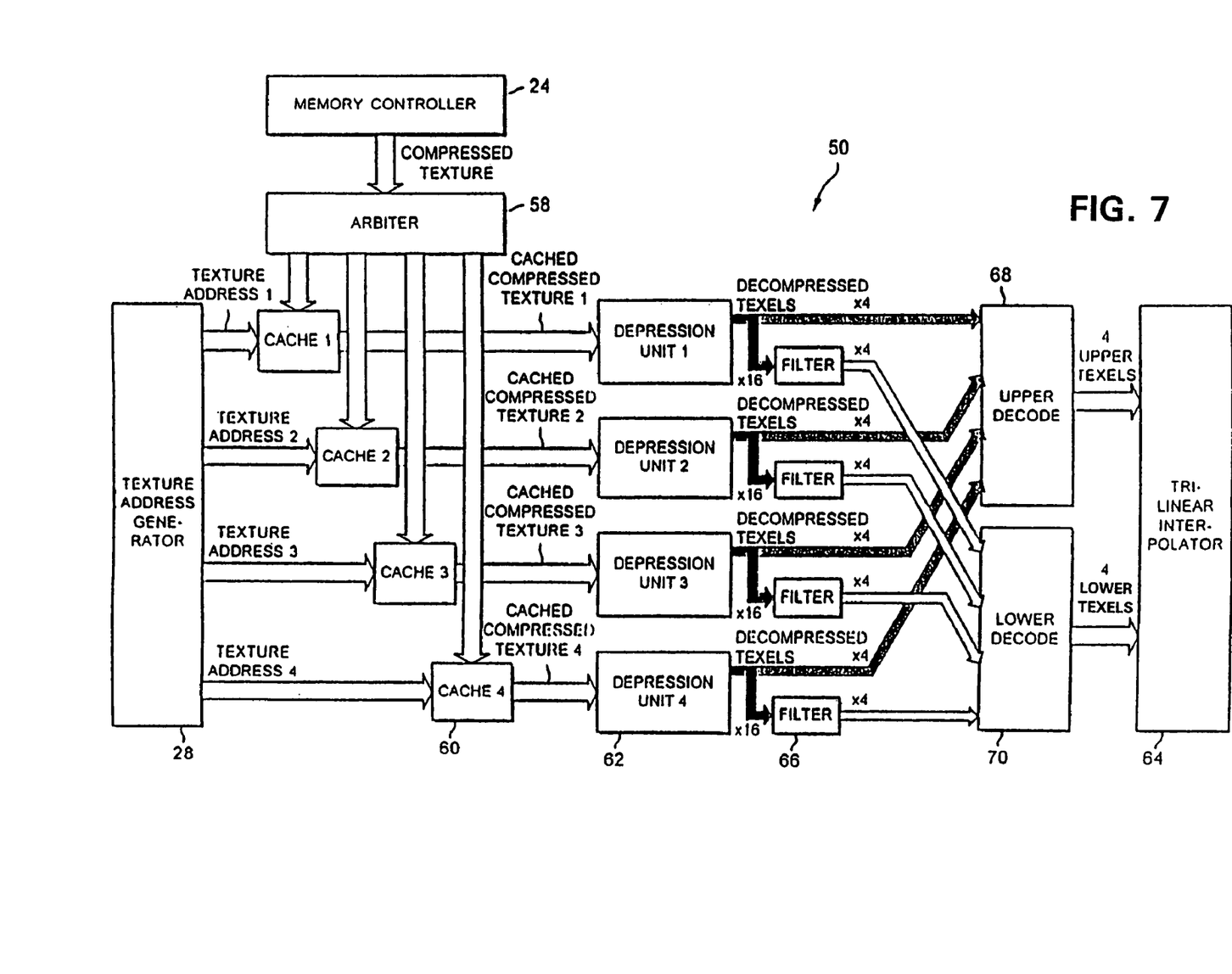
FIG. 7 is a block schematic diagram similar to FIG. 4 of a second embodiment of the invention using four caches and four decompression units in parallel.

A four-cache and four-DU construction can provide all requisite data in one clock period, no matter where the compressed data resides. FIG. 7 shows a block diagram of a second embodiment of the invention which comprises such a 'quad cache' arrangement. The texturing system of FIG. 7 is similar to the system of FIG. 4 and only the differences will be described in detail. In the second embodiment of FIG. 7, the memory system 22 and input 26 are the same as in FIG. 4. In this case the texture address generator 28 has four outputs to cope with the situation where the outputs of a maximum of four tiles are required. The four outputs provide respectively texture addresses 1 to 4, and these are applied to texture caches 1 to 4, referenced 60. These communicate to and from the memory controller 24 through an arbiter 58, so as to receive the texels from the four tiles respectively. These are held in the four caches, which thus output four cached compressed textures, namely cached compressed texture 1 to 4 respectively.

The outputs of the four caches 60 are respectively applied to four decompression units 62, each similar to the decompression unit of FIG. 4. Each decompression unit 62 applies its decompressed data to upper and lower decode units 68, 70, and also to a low-level mip-map filter 66. The outputs of the upper and lower decode units 68,70 are respectively applied to a trilinear interpolator 64.

In operation, each cache 60 is responsible for a different segment of the memory, based on the size of a cache word and the lower two bits of the texture address representing each cache word. In this way it can be guaranteed that a single cache will not be called upon to provide more than one data word for a complete trilinear pixel.

Without being able to generate the lower-level mip-map from the upper one, eight caches and DUs would be required, four for the upper map and four for the lower map. Thus, the generation of lower-level mip-maps as required 'on the fly' saves logic (silicon area) as well as improving performance. When coupled with compression, the amount of data required is also greatly reduced.

It will be appreciated that the lower-level mip-maps are still stored in the memory. They will be required for pixels which are yet further away from the viewer. However, it proves to be more efficient in the trilinear interpolation to ignore their presence and to regenerate those texels which are needed for the pixels being processed using the generators 62.

One of the major advantages of generating lower-level mip-maps from compressed upper-level mip-maps is the amount of logic optimisation that can take place. Less logic leads to smaller hardware and lower cost. One such area of optimisation is in the caches and decompression units.

Figure 8A:
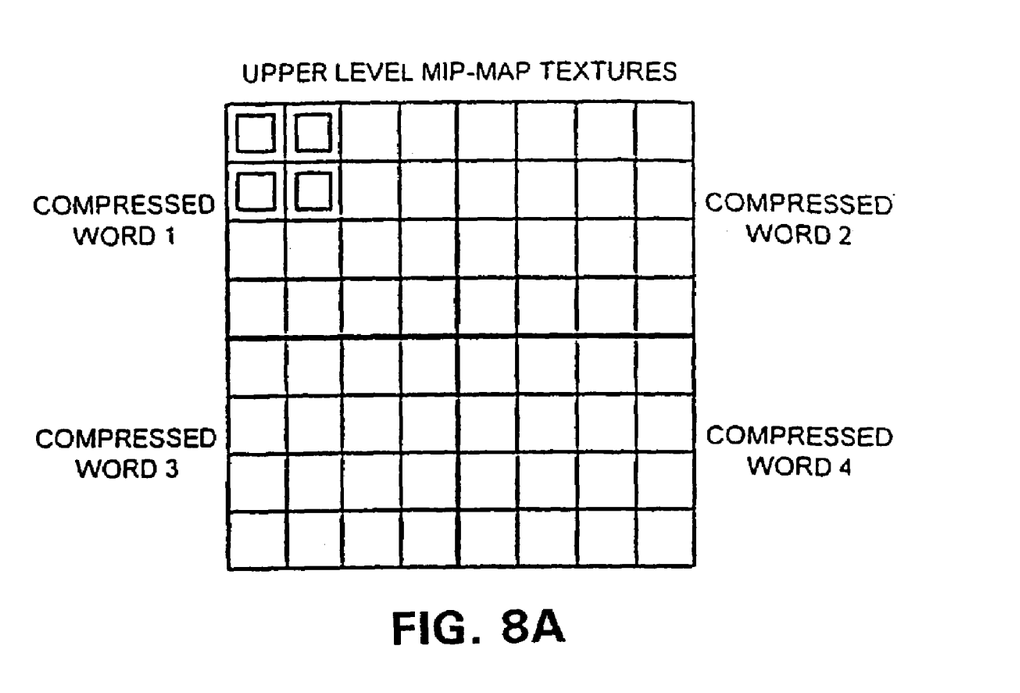
FIGS. 8A and 8B illustrate in similar manner to FIGS. 6A and 6B the storage of texture words in a best-case scenario.
Figure 8B:
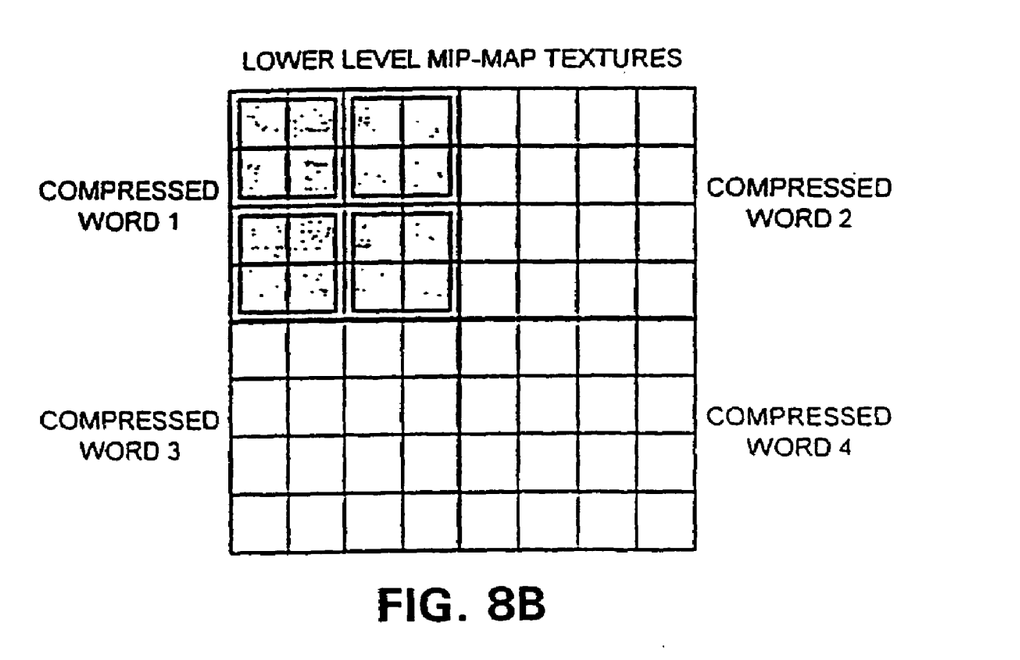

The caches 60 for the quad cache system are effectively memory mapped, i.e. each cache holds data for a separate tile of texture memory, as noted above. However, the DUs 62 do not necessarily have to be memory mapped as well. Memory mapping of DUs would require that each is associated with a particular cache. This would also necessitate each DU being able to produce at least four upper-level texels as well as four lower-level texels in one cycle to cater for the best case situation. The best case situation is illustrated in FIGS. 8A and 8B where all the tiles come from one data word.

By allowing each DU to be dynamically reallocated based on the resources required, then several hardware optimisations can take place to dramatically reduce the size of the hardware required. We have determined that not more than one unit need provide four parallel upper-level texels, not more than two units need provide two parallel upper-level texels, and none need provide more than one lower-level texel.

Figure 9:
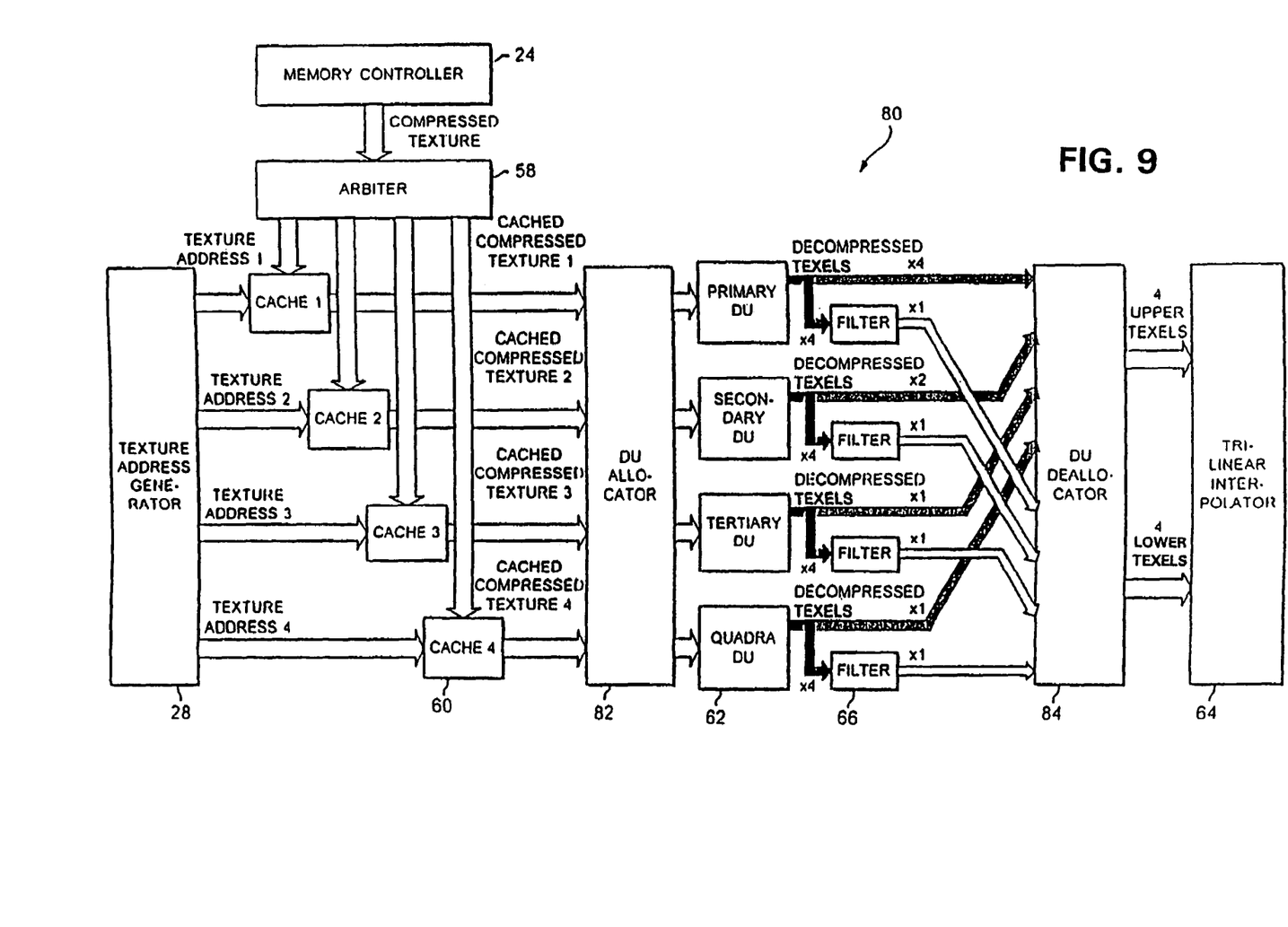
FIG. 9 is a block diagram of a modification of the embodiment of FIG. 7, in which the decompression units are dynamically re-allocated.

FIG. 9 shows how these optimisations fit into a modified quad cache system. The modified arrangement of FIG. 9 is similar to the arrangement of FIG. 7 and only the differences need be described. These are the inclusion of a decompression unit (DU) allocator 82, which is connected between the outputs of the four caches 60 and the inputs of the four decompression units 62, and a corresponding deallocator 84, which replaces the upper and lower decode units 68,70 and is connected between the outputs of both the four DUs 62 and the filters 66, and the inputs to the trilinear interpolator 64. The DUs 62 are no longer identical; the primary DU can provide four parallel upper-level texels, the secondary DU can provide two parallel upper-level texels, and the tertiary and quadra DU can each provide only one upper-level texel. The DU allocation unit 82 determines which of the DUs 62 are required, based on the configuration of the texture addresses. Logic reduction takes place both on the registered outputs of each DU and the multiplexing of the texture output from each DU. The deallocation unit 84 now takes over from the upper and lower decode units 68,70, this time returning the dynamically allocated resource data to the data paths that originally requested the texels. The arithmetic used to filter the four lower-level mip-map texels is also simplified.

The outputs are shown as being deallocated by the deallocator 84, but this may not be necessary depending on the manner in which the output of the trilinear filter 64 is handled. This is an implementational detail which will be clear to the person skilled in the art.

Another area of logic optimisation is in the filters 40 (FIG. 5) that generate the lower-level mip-map. If the compression scheme is of a type which uses an index to look up a code book, such as in VQ or Palletised (see above), then in this case the texture components can be arranged in such a way as to enable ease of lower mip-map generation. That is, if the code book entries are generated by evenly sampling the uncompressed texture over its color range, the indexes themselves can be used as the input to the mip-map filters to generate the new lower-level mip-map. The resulting index will then point to the closest code book equivalent of the filtered texture. The bit width of the filtering arithmetic on the indexes (compressed texture) is much smaller than had the filter been applied to the uncompressed texture.

Figure 10:
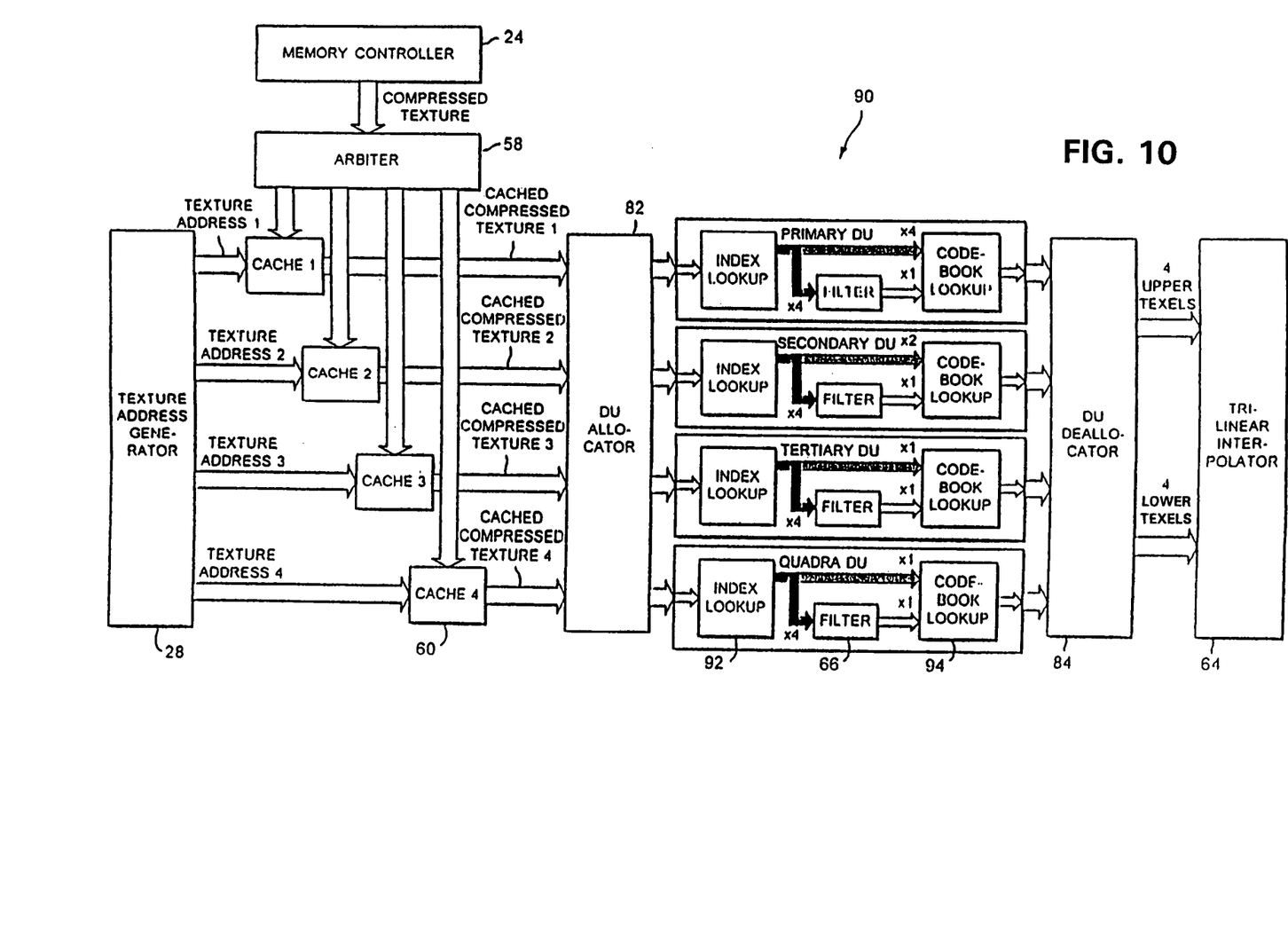
FIG. 10 is a block diagram of another modification of the circuit of FIG. 7.

Such an arrangement is illustrated in FIG. 10 of the drawings. This is based on FIG. 7, though it could of course also include the modification of FIG. 9.

FIG. 10 shows how the filter 66 now appears inside the decompression unit 62. Each decompression unit 62 has an index lookup section 92 connected to the output of the allocator 82, to provide indices which are filtered by the filter 66 before being applied to a codebook lookup section 94 where the filtered indices are used to find the corresponding codebook portion.

Figure 11:
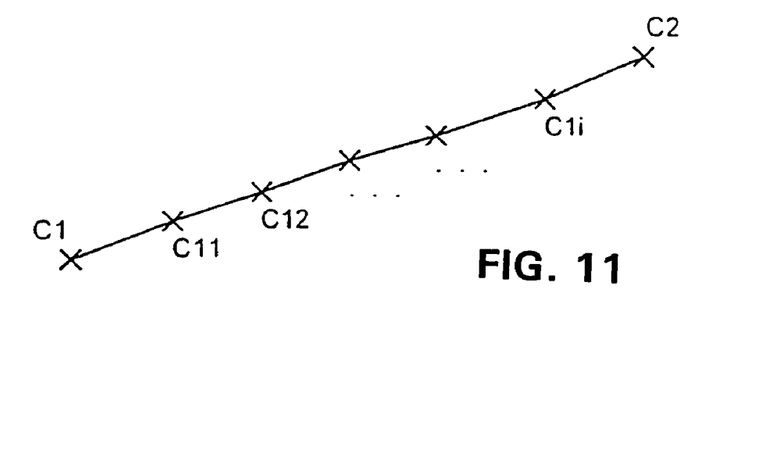
FIGS. 11 and 12 illustrate how interpolation can be directly applied to compressed texture codes.

FIG. 11 diagrammatically illustrates the relationship between the compressed code values and the colors they represent. The diagram is assumed to be a part of the color triangle representing all possible colors on a two-dimensional plane. Two colors C1 and C2 are denoted as principal colors. They define the ends of a line on which other intermediate colors C11 to C1i lie. These other colors can therefore be formed by taking an appropriate weighted average of the colors C1 and C2. The code values for the colors C11 to C1i are likewise defined by averaging the code values of the colors C1 and C2.

The normal way of producing the intermediate colors is to start with the compressed code values of the colors C1 and C2 and to determine the actual color values of the colors C1 and C2 to the accuracy of the system, which may require 16 or even 24 bits per color. A weighted average is then performed on the 16 or 24 colors values thus obtained. However, we have appreciated that when the relationship between the colors and their code values is defined in the way just described, it is possible to average the code values first and then subsequently to convert the averaged code value thus obtained to the nearest available color. This means that the averaging operation no longer has to be done with 16 or more bits of data, but can now be done with just the two or so bits which are required to define the different compressed code values in use.

Figure 12:
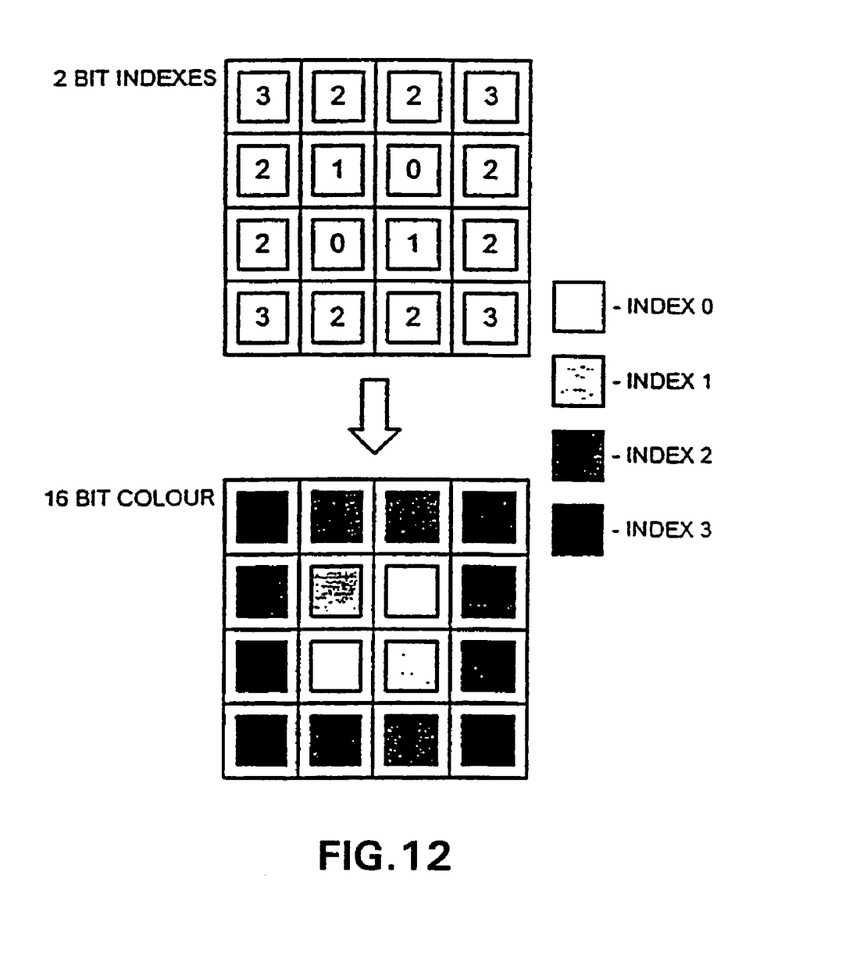

This lower mip-map optimisation technique can also be applied to Direct X compressed textures [ref. 14]. Here the two primary colors and the interpolated intermediate values pointed to by indexes are spaced evenly apart. FIG. 12 shows how 2-bit indexes are mapped to 16-bit texture colors. It is seen that the 2-bit indexes themselves can be filtered instead of the full 16-bit value. This represents much less logic and therefore less overall cost.

In summary, the illustrated method of generating texture data for use in texturing an image, is seen to comprise first representing texture data by arbitrary compressed codes, in which selected compressed code values define principal colors and other compressed code values define colors which can be formed by selected weighted averages of principal colors, the corresponding code values also being weighted averages of the code values of the selected principal colors. Then an output texel is interpolated from a plurality of input texels, with the interpolating step being effected using compressed code values. The code values are subsequently decompressed to give the actual color values.

This method finds application for other purposes than just in the lower-level mip-map generator illustrated. It can be used whenever it is desired to generate intermediate colors which are held in compressed form, provided that the compressed codes bear a linear relationship which parallels that of the actual colors themselves. In particular, it can be used in the original generation of the mip-maps held in the memory 22.

The embodiments of the invention which have been described and illustrated provide various improvements over the known systems. In particular, efficient use is made of memory bandwidth for trilinear filtering, especially when using texture compression caches. By generating the lower-level mip-map data from compressed upper-level mip-map data as it is required, accesses across page breaks are reduced. A quad cache arrangement can be used to guarantee one trilinear filtered pixel per clock period. The operation of the decompression logic is improved by using dynamic decompression resource allocation. Finally, the unification of the lower-level mip-map generation with the decompression logic provides a system with relatively low overhead.

It will be appreciated that many modifications may be made to the systems described and illustrate which represent only selected and presently preferred embodiments of the invention.

The invention claimed is:

1. A texturing system for use in a three-dimensional imaging system, comprising:

memory means for storing mip-map data for use in texturing an image, the mip-map data comprising a hierarchical series of mip-maps of different levels of decreasing resolution, said memory means configured to store the mip-map data in compressed form as selected and compressed code values defining principle colors and other compressed code values defining intermediate colors that are formed by selected weighted averages of the principle colors, with the code values defining the intermediate colors being weighted averages of the code values of selected principle colors;

input means for receiving input data indicating the type of mip-map data required and the level of the mip-map or mip-maps from which the data is to be obtained;

control means coupled to said input means and to said memory means for retrieving from said memory means the compressed mip-map data for a selected mip-map level required in accordance with the input data;

cache means coupled to said control means for storing portions of the compressed mip-map data retrieved from said memory means for the selected mip-map level;

decompression means connected to said cache means for receiving from said cache means the compressed mip-map data, said decompression means configured to filter the compressed code values of the mip-map data to generate decompressed mip-map data;

lower-level mip-map generator means coupled to said cache means for receiving the decompressed mip-map data for the selected mip-map level, said lower-level mip-map generator configured to produce at least a portion of the mip-map for the next below mip-map level in the hierarchical series of mip-maps for which a portion is held in the cache means; and trilinear interpolator means coupled to said decompression means to receive the decompressed mip-map data for the selected level of mip-map and to said lower level mip-map generator to receive mip-map data for the next below mip-map level in the hierarchical series and to interpolate an output texel from input texels contained in the mip-map data from the two received mip-map levels.

2. The texturing system according to claim 1, wherein:
said decompression means has an input directly coupled to said cache means and an output;
said trilinear interpolator means is directly coupled to the output of said decompression means; and
said lower-level mip-map generator means is directly coupled to the output of said decompression means.

3. The texturing system of claim 2, wherein said lower-level mip-map generator means comprises four interpolators which operate on 16 texels from the mip-map data held in the cache means to provide four texels for the next below level mip-map.

4. The texturing system according to claim 1, wherein:
there are four said cache means arranged in parallel; and
there are four said decompression means arranged in parallel.

5. The texturing system of claim 4, further including a first allocating means located between said four cache means and said four decompression means for selectively allocating the outputs of said different caches to selected ones of said decompression means.

6. The texturing system of claim 5, wherein:
a first one of said decompression means receives compressed mip-map data from a selected one of said caches through said first allocation unit and supplies a maximum of four texels for selection as upper mip-map texels;
a second one of said decompression means receives compressed mip-map data from a selected one of said caches through said first allocation unit and supplies a maximum of two texels for selection as upper mip-map texels;
a third one of said decompression means receives compressed mip-map data from a selected one of said caches through said first allocation unit and supplies a single texel for selection as an upper mip-map texel;
a fourth one of said decompression means receives compressed mip-map data from a selected one of said caches through said first allocation unit and supplies a single texel for selection as an upper mip-map texel; and
means for selecting upper texels is connected to said four decompression means for receiving the texels and is configured to selectively apply the texels supplied by said four decompression means to said trilinear interpolator means as the decompressed mip-map data for the selected mip-map level.

7. The texturing system of claim 6, wherein said means for selecting upper texels is a second deallocator.

8. The texturing system of claim 5, wherein said lower-level mip-map generator comprises:
said four decompression means; and
four filtering means, each said filtering means being connected to a separate one of said decompression means, each said decompression means-filtering means pair being configured to produce a texel for the next below level mip-map by filtering the mip-map data in said decompression means while the mip-map data is in a compressed form.

9. The texturing and system of claim 8, wherein each said decompression means-filtering means pair comprises a scaler filter and an interpolation means.

10. The texturing system of claim 4, wherein said lower-level mip-map generator means comprises four interpolators which operate on 16 texels from the mip-map data held in the cache means to provide four texels for the next below level mip-map.

11. The texturing system of claim 4, wherein said lower-level mip-map generator comprises:
said four decompression means; and
four filtering means, each said filtering means being connected to a separate one of said decompression means, each said decompression means-filtering means pair being configured to produce a texel for the next below level mip-map by filtering the mip-map data in said decompression means while the mip-map data is in a compressed form.

12. The texturing system of claim 11, wherein each said decompression means-filtering means pair comprises a scaler filter and an interpolation means.

13. A method of texturing for use in three-dimensional imaging, comprising the steps of:
storing in a memory mip-map data for use in texturing an image, the mip-map data comprising a hierarchical series of mip-maps of different levels of decreasing resolution wherein, in said step of storing, the mip-map data are stored in compressed form as selected and compressed code values defining principle colors and other compressed code values defining intermediate colors that are formed by selected weighted averages of the principle colors, with the code values defining the intermediate colors being weighted averages of the code values of selected principle colors;
receiving input data indicating the type of mip-map data required and the level of the mip-map or mip-maps from which the data is to be obtained;
retrieving from the memory the compressed mip-map data for a selected mip-map level required in accordance with the input data;
storing in a cache portions of the compressed mip-map data retrieved from the memory for the selected mip-map level;
decompressing the compressed mip-map data stored in the cache by filtering the compressed code values of the mip-map data to generate decompressed mip-map data for the selected mip-map level;
generating, in real-time, mip-map data for portions of the mip-map for the next below mip-map level in the hierarchical series of mip-maps from the selected mip-map level, wherein said generation of the mip-map data is performed using the decompressed mip-map data for the selected mip-map level stored in the cache; and
performing a trilinear interpolation on the decompressed mip-map data for the selected mip-map level and the generated mip-map data for the next below mip-map level to generate an output texel from the two levels of mip-map data.

14. The method of texturing of claim 13, wherein:
said step of decompressing the compressed mip-map data is performed by a decompressing means that receives the compressed mip-map data directly from the cache in which the compressed mip-map data are stored; and
said step of generating mip-map data for the next below level mip-map is performed on decompressed data obtained in said step of decompressing the mip-map data.

15. The method of texturing of claim 13, wherein:
in said step of storing the compressed mip-map data, the compressed mip-map data are stored in four caches; and
in said step of decompressing the compressed mip-map data, the decompression is performed by four decompressing means.

16. The method of texturing of claim 13, wherein:
in said step of storing the compressed mip-map data, the compressed mip-map data are stored in four caches;
in said step of decompressing the compressed mip-map data, the decompression is performed by four decompressing means; and
prior to said step of decompressing the compressed mip-map data, the compressed mip-map data stored in the individual caches are selectively allocated to different ones of the decompression means.

17. The method of texturing of claim 13, wherein said step of generating mip-map portions for the next below mip-map level is performed by four interpolators which operate on 16 texels from the mip-map data stored in the cache to provide four texels for the next below mip-map level.

18. A texturing system for use in a three-dimensional imaging system, comprising:
memory means for storing mip-map data for use in texturing an image, the mip-map data comprising a hierarchical series of mip-maps of different levels of decreasing resolution, said memory means configured to store the mip-map data in compressed form as selected and compressed code values defining principle colors and other compressed code values defining intermediate colors that are formed by selected weighted averages of the principle colors, with the code values defining the intermediate colors being weighted averages of the code values of selected principle colors;
input means for receiving input data indicating the type of mip-map data required and the level of the mip-map or mip-maps from which the data is to be obtained;
control means coupled to said input means and to said memory means for retrieving from said memory means the compressed mip-map data for a selected mip-map level required accordance with the input data; and
cache means coupled to said control means for storing portions of the compressed mip-map data retrieved from said memory means for the selected mip-map level;
decompression means for receiving cached compressed mip-map data, said decompression means configured to decompress the mip-map data by filtering the compressed code values of the mip-map data to produce decompressed mip-map data of the selected mip-map level and of the next mip-map level below; and
trilinear interpolator means coupled to said decompression means to receive both decompressed mip-map data for the selected level of mip-map and decompressed mip-map data for the next below mip-map level in the hierarchical series, and to interpolate an output texel from input texels contained in the mip-map data from the two received mip-map levels.

19. A method of texturing for use in three-dimensional imaging, comprising the steps of:
storing in a memory mip-map data for use in texturing an image, the mip-map data comprising a hierarchical series of mip-maps of different levels of decreasing resolution wherein, in said step of storing, the mip-map data are stored in compressed form as selected and compressed code values defining principle colors and other compressed code values defining intermediate colors that are formed by selected weighted averages of the principle colors, with the code values defining the intermediate colors being weighted averages of the code values of selected principle colors;
receiving input data indicating the type of mip-map data required and the level of the mip-map or mip-maps from which the data is to be obtained;
retrieving from the memory the compressed mip-map data for a selected mip-map level required in accordance with the input data;
storing in a cache portions of the compressed mip-map data retrieved from the memory for the selected mip-map level;
decompressing both the compressed mip-map data for the selected mip-map level and the compressed mip-map data generated for the next below mip-map level by filtering the compressed code values of the mip-map data to produce decompressed mip-map data for both the selected mip-map level and the next below mip-map level; and
performing a trilinear interpolation on the decompressed mip-map data for the selected mip-map level and the generated mip-map data for the next below mip-map level to generate an output texel from the two levels of mip-map data.

20. A texturing system for use in a three-dimensional imaging system, comprising:
memory means for storing mip-map data for use in texturing an image, the mip-map data comprising a hierarchical series of mip-maps of different levels of decreasing resolution, said memory means configured to store the mip-map data in compressed form as selected and compressed code values defining principle colors and other compressed code values defining intermediate colors that are formed by selected weighted averages of the principle colors, with the code values defining the intermediate colors being weighted averages of the code values of selected principle colors;
input means for receiving input data indicating the type of mip-map data required and the level of the mip-map or mip-maps from which the data is to be obtained;
control means coupled to said input means and to said memory means for retrieving from said memory means the compressed mip-map data for a selected mip-map level required in accordance with the input data;
cache means coupled to said control means for storing portions of the compressed mip-map data retrieved from said memory means for the selected mip-map level;
decompression means connected to said cache means for receiving from said cache means the compressed mip-map data, said decompression means configured to filter the compressed code values of the mip-map data to generate decompressed mip-map data;

lower-level mip-map generator means coupled to said cache means for receiving the decompressed mip-map data for the selected mip-map level, said lower-level mip-map generator configured to produce at least a portion of the mip-map for the next below mip-map level in the hierarchical series of mip-maps for which a portion is held in the cache means; and trilinear interpolator means coupled to said decompression means to receive the decompressed mip-map data for the selected level of mip-map and to said lower level mip-map generator to receive mip-map data for the next below mip-map level in the hierarchical series and to interpolate an output texel from input texels contained in the mip-map data from the two received mip-map levels, wherein said lower-level mip-map generator means comprises four interpolators which operate on 16 texels from the mip-map data held in the cache means to provide four texels for the next below level mip-map.

* * * * *